Oct. 9, 1945.   P. HELLMAN   2,386,461
MILLING ATTACHMENT FOR LATHES
Filed July 20, 1942   3 Sheets-Sheet 2
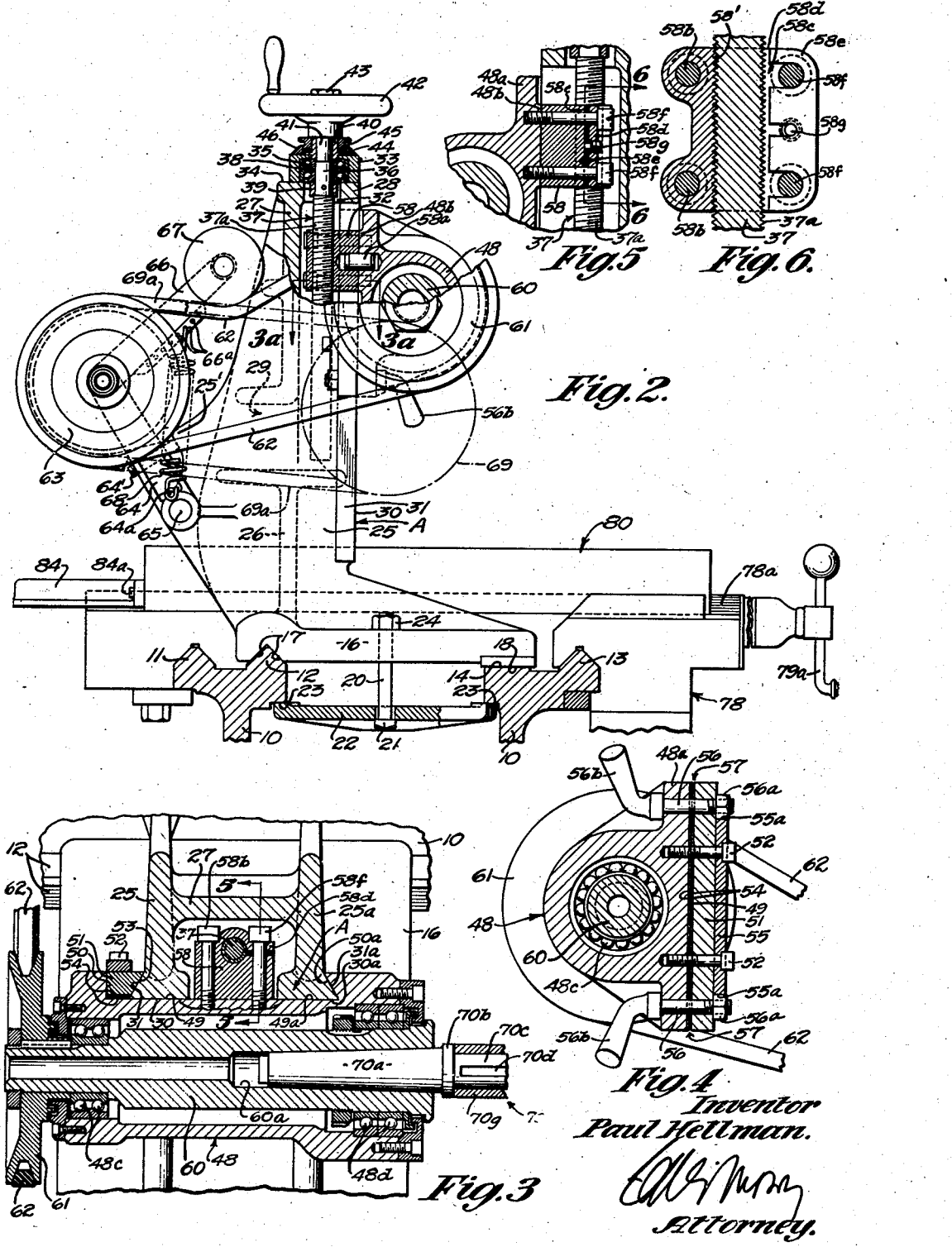

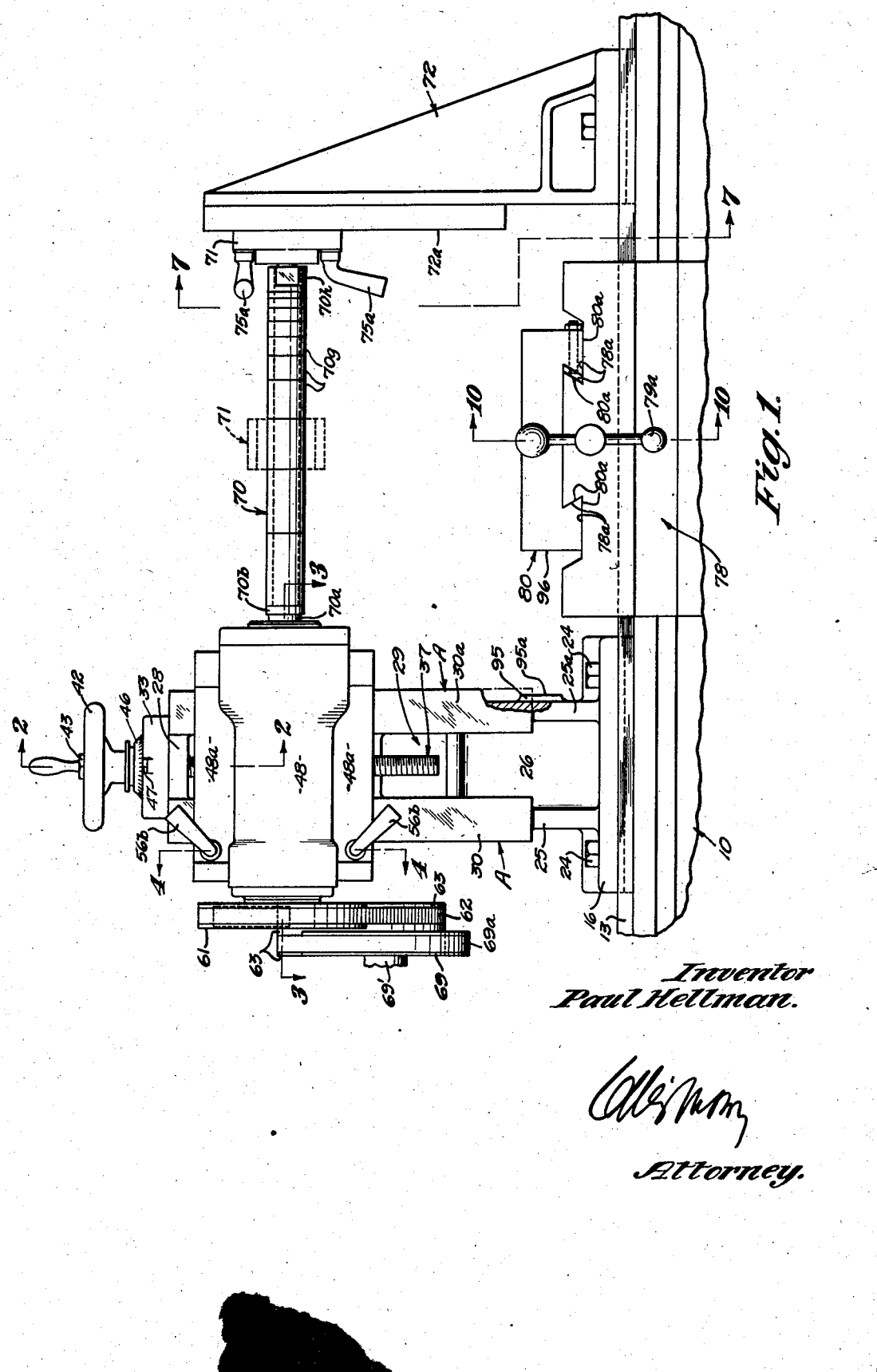

Oct. 9, 1945. P. HELLMAN 2,386,461
MILLING ATTACHMENT FOR LATHES
Filed July 20, 1942 3 Sheets-Sheet 3
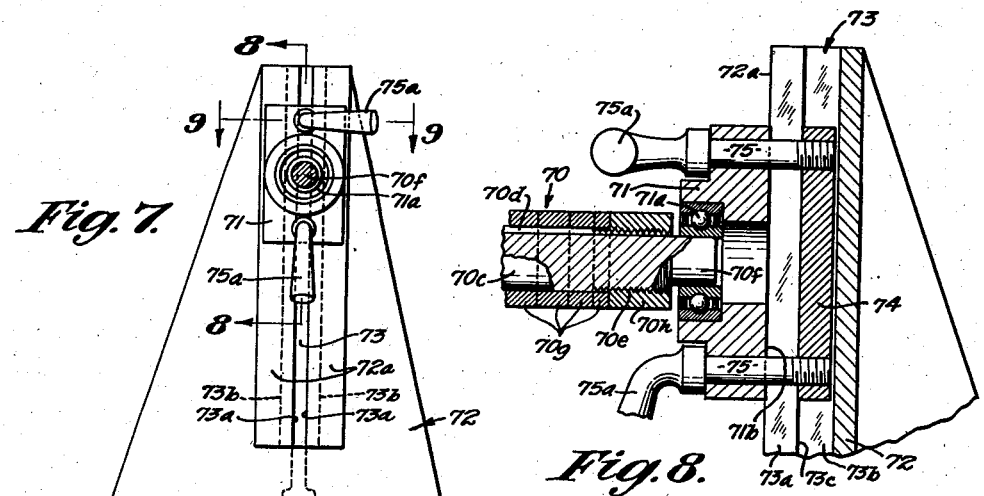
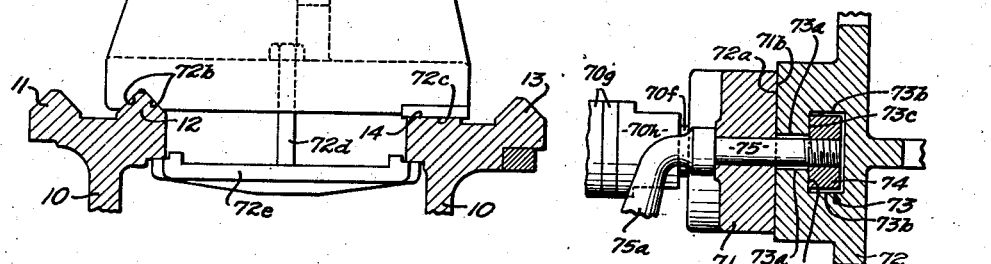
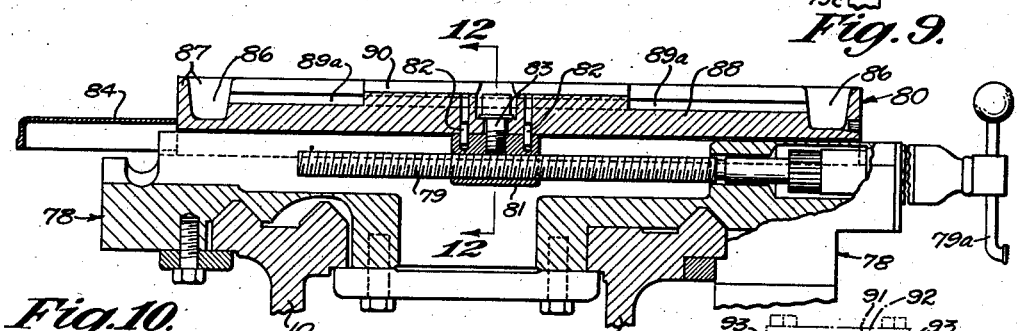
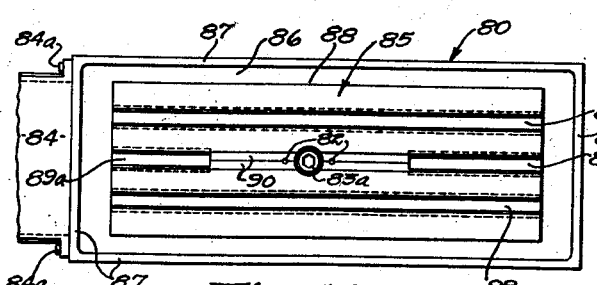
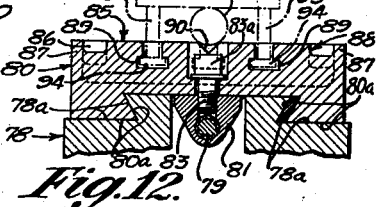
Inventor
Paul Hellman.
Attorney Patented Oct. 9, 1945

2,386,461

UNITED STATES PATENT OFFICE 2,386,461

MILLING ATTACHMENT FOR LATHES

Paul Hellman, Los Angeles, Calif., assignor to Globe Products Manufacturing Company, Los Angeles, Calif., a corporation of California Application July 20, 1942, Serial No. 451,623

4 Claims. (Cl. 90—11)

My invention relates to milling machines and, in its more specific aspects, it has to do with improvements in attachments for converting lathes into milling machines as well as for increasing the swing of a lathe for turning operations and the like.

The attachments embodied in this invention comprise, generally, a vertically adjustable spindle head having a rotatable spindle therein which is adapted to be driven from the headstock spindle of the lathe, a longitudinally and transversely adjustable work table, and an adjustable arbor support which is adapted to support the free end of an arbor, when used, which at its other end is drivingly engageable with the driven spindle. The spindle head slidably engages the vertical ways of a spindle-head support which slidably engages, and is adapted to be clamped to the ways of the lathe bed. The arbor support comprises an arbor bearing member which slidably engages, and is adapted to be clamped to the vertical ways of an arbor support base which is adapted to slidably engage, and to be clamped to the ways of the lathe bed. The work table is adapted to slidably engage the cross-slide ways of the carriage, and also to have screwthreaded engagement with the cross feed screw in order that the work table may be longitudinally and transversely moved by the traversing and cross-feeding mechanism usually embodied in the lathes herein referred to.

I am aware that attachments for converting lathes into milling machines are generally known in the art and I do not claim such a combination except insofar as my improvements have peculiar advantages when incorporated with a lathe. In some of its aspects, my invention involves improvements which materially increase the efficiency, precision and range of operations possible in milling machines and particularly when used as lathe attachments.

It is among the objects of this invention to embody in such attachments combinations and arrangements of parts which lend themselves to simplicity and economy in manufacture, and to the provision and maintenance of maximum precision in operation with a minimum of precision machining required in their manufacture.

It is also an object of my invention to provide a milling attachment for lathes having improved means for clamping the cutter spindle head to the ways along which it is adjustable.

Another object is the provision, in a device of this character, of novel and efficient means for maintaining precision fit of the cooperating screw and nut means employed for vertically adjusting the cutter spindle head.

Another object is the provision of an improved arbor support embodying novel means for automatic alinement adjustment of the longitudinal axis of the arbor such as is often required to compensate for improper adjustment of lathe beds.

Another object is the provision of adjustable means for accurately determining displacement of the work table with respect to the cutter spindle head.

Another object is the provision in a device of this character of an efficient and improved work table.

The present invention will be readily understood from the following description of a preferred embodiment, reference being had to the accompanying drawings, in which:

Fig. 1 is a front elevation of the milling machine attachments as applied to and associated with the bed and carriage of a lathe, the bed and carraige being only fragmentarily shown;

Fig. 2 is an end elevation of Fig. 1 as viewed from the left, the upper portion being shown in section as indicated by line 2—2 of Fig. 1; the arbor support is omitted from this figure for purposes of illustration;

Fig. 3 is a horizontal section of the spindle head taken on line 3—3 of Fig. 1, a fragmentary portion of this view being taken on line 3a—3a of Fig. 2;

Fig. 4 is a vertical section of the spindle head taken as indicated by line 4—4 of Fig. 1 and showing certain clamping arrangements;

Fig. 5 is an enlarged detailed section taken on line 5—5 of Fig. 3;

Fig. 6 is a detailed section taken on line 6—6 of Fig. 5;

Fig. 7 is an end elevation of the arbor support viewed as indicated by line 7—7 of Fig. 1;

Fig. 8 is an enlarged vertical section taken as indicated by line 8—8 of Fig. 7;

Fig. 9 is an enlarged horizontal section taken on line 9—9 of Fig. 7;

Fig. 10 is a vertical section of the work table and lathe carriage taken as indicated by line 10—10 of Fig. 1;

Fig. 11 is a reduced plan view of the work table; and

Fig. 12 is a vertical section taken on line 12—12 of Fig. 10.

The lathe bed 10, to which the invention is applied, is shown by way of example, and comprises rear inverted V-shaped ways 11 and 12, a forward inverted V-shaped way 13 and a forward flat horizontal way 14. The spindle head supporting base 16 is provided with machined surfaces 17 and 18 adapted, respectively, to slidably engage ways 12 and 14. Base 16 is apertured to receive a pair of bolts 20, heads 21 of which engage clamping plates 22 having rounded ends which are disposed beneath surfaces 23 of the lathe bed. Base 16 may be clamped in any adjusted position longitudinally of the lathe bed by taking up on nuts 24 and thus bringing plates 22 into clamping engagement with surfaces 23. Base 16 is positioned transversely of the bed by its engagement with the inverted V-shaped way 12, surface 18 merely floating horizontally upon way 14. In this manner, maximum accuracy as regards the transverse positioning of the base is obtained with a minimum of precision machining in manufacture.

Base 16 includes and has integrally formed therewith a pair of uprights 25, 25a which are braced by interconnecting members 26, 27 and 28. Members 26 and 27 are spaced apart as indicated at 29 for purposes as will appear later. Uprights 25, 25a are provided with vertical ways, generally indicated at A, comprising forward surfaces 30, 30a and rearwardly angling surfaces 31, 31a which surfaces are machined.

Member 28 is vertically apertured at 32, and mounted over this aperture is a bearing block 33 which is suitably secured as by bolts (not shown) to the upper machined surface 34 of member 28 and uprights 25, 25a. Bearing block 33 is provided with a combination radial and thrust bearing 35 within which is rotatably mounted the upper reduced end 36 of a vertical feed screw shaft generally indicated at 37. Shaft 37 is vertically positioned relative to inner bearing race 38 by means of collar 39, which is pinned to reduced screw shaft portion 36 and engages the race at one end, and a collar 40 positioned upon a further reduced portion 41 of the screw shaft, which engages the other end of the race. A hand wheel 42, suitably keyed to shaft portion 41, is brought into clamping engagement with collar 40, which in turn bears against inner race 38 to clamp it against collar 39, by means of a nut 43 suitably threaded upon the upper end of the screw shaft. Collar 40 is provided with an annular flange 44 overlying the bearing block, and resting upon the upper surface of said flange is a spring washer 45. Frictionally held between the spring washer and hand wheel 42, and rotatably mounted upon the upper portion of collar 40 is a settable, calibrated disc 46, the calibrations of which are readable against mark 47 on the bearing block for the purpose of reading degrees (or other units) of rotation of the vertical screw shaft.

A tubular spindle head 48 (see particularly Fig. 3) is provided with machined, plane surfaces 49, 49a, 50 and 50a, surfaces 49, 49a, 50a of which are respectively adapted to slidably engage surfaces 30, 30a and 31a of vertical ways A. A gib 51, positioned against shoulder 50 and secured to the spindle head by means of cap screws 52, is provided with an angled, machined surface 53 which is adapted to slidably engage surface 31 of the ways. One or more shims 54 are positioned between gib 51 and surface 49 of the spindle head, and it is by means of these shims that the required sliding fit between surfaces 30, 30a, 31, 31a and surfaces 49, 49a, 53, 50a, respectively, is obtained. A bar 55, having squared ends 55a, is positioned between gib 51 and the heads of bolts 52, and ends 55a are adapted to engage the flats of the hex nuts 56a on the threaded ends of bolts 56 (see Fig. 4) which pass through gib 51 and base 48a of the spindle head. The forward ends of bolts 56 are provided with handles 56b. The ends of one of shims 54 terminate short of bolts 56 to provide clearance spaces 57 by virtue of which the ends of gib 51 may be flexed toward base 48a when bolts 56b are taken up to bring said ends into clamping engagement with surface 31 of ways A and thus clamp the spindle head to the ways.

If for any reason (such as wear) handles 56b are not in a convenient position to be grasped, or if one or the other engages the spindle head before it is fully taken up, the position of the handles may be readily adjusted by removing bar 55 and turning nuts 56a and handles 56b until the handles are at a desired position. The nuts are then again held from turning when bar 55 is replaced with its ends engaging the flats of the nuts.

Positioned between ways A, and within the space defined by members 25, 25a and 27, is a nut 58 which is positioned and secured to pad 48b, provided on the rear face of spindle head base 48a, by means of pin 58a and bolts 58b, nut 58 having screwthreaded engagement with screwthreaded portion 37a of vertical screw shaft 37. Nut 58 is slotted at one side through to its threaded bore 58', as indicated at 58c (see Figs. 5 and 6) to provide a yieldable lip 58d. One or more shims 58e are placed within slot 58c and are clamped within the slot by means of bolts 58f which pass through apertures provided in lip 58d and nut 58 and thread into the spindle head base 48a. Thus by inserting or removing the shims, the desired accuracy of fit of the nut with screw 37a may be obtained. To facilitate insertion or removal of the shims after they once have been clamped in place, a set screw 58g, threaded through lip 58d and engageable with the nut body at the opposite side of slot 58c, serves to flex the lip rearwardly and thus free the shims. The set screw and bolts associated with nut 58 are of the socketed head type and are accessible through opening 29, above referred to, between members 26 and 27 of the spindle head base when the spindle head is at its lowermost position.

Spindle head 48 is provided with bearings 48c, 48d within which is rotatably mounted hollow spindle 60 having at one end a tapered, toolshank-receiving bore 60a. The other end of the spindle is provided with a pulley 61, keyed thereto, through which the spindle is driven by V belt 62. Belt 62 passes over, and is driven from, a double pulley 63 which is rotatably mounted on the free end of a swinging arm 64 pivoted at 65 to upright 25. An adjustment screw 64' is threaded through arm 64 and engages a projection 25' on upright 25 whereby the angularity of arm 64 relative to the upright and accordingly the distance between pulleys 61 and 63 may be varied. An arm 66 is pivoted to the free end of arm 64, on an axis coincident with the axis of pulley 63, and is provided at its free end with a tensioning idler 67 engageable with belt 62. A tension spring 68 is disposed between arms 64 and 66, one end being connected to arm 64 via pin 64a and the other end being engageable with any one of a series of apertures 66a provided along the edge of arm 66. By means of this arrangement (once the position of pulley 63 has been set) the tension of belt 62 may easily be varied by moving the upper end of spring 68 from one aperture 66a to another. This adjustment, at times, becomes necessary during movement of the spindle head vertically of the spindle-head-supporting base.

Pulley 63 is driven from pulley 69 via belt 69a, pulley 69 having a hub 69' by means of which it is drivingly engaged with and driven by the headstock spindle (not shown) of the lathe.

An arbor 70, by means of which certain milling tools or cutters (such as indicated in dotted lines at 71 in Fig. 1) may be connected with spindle 68, is provided with a tapered shank 70a adapted to wedgingly engage the tapered bore 60a of the spindle. Adjacent shank 70a, the arbor is provided with a shoulder or flange 70b, and beyond which the arbor portion 70c is cylindrical and of reduced diameter. A keyway 70d is provided in arbor portion 70c throughout its length and is adapted to receive the key (not shown) of a milling tool. The free end of arbor portion 70c is screwthreaded at 70e, and beyond is a short pilot 70f of further reduced diameter (see Fig. 8). Arbor portion 70c, as shown, is provided with a series of spacers 70g (of varying lengths) positioned between shoulder 70b and nut 70h which engages the screwthreaded portion 70e of the arbor. Nut 70h may be removed in order that spacers 70g may be shifted or replaced by milling tools as desired.

The free end of the arbor is supported by the engagement of pilot 70f with bearing 71a carried by one end of a bearing block 71. The opposite end of the bearing block is provided with a flat machined surface 71b which is adapted to engage the machined face 72a of arbor support 72. Recessed into face 72a is a vertical T slot 73 having spaced surfaces 73a, 73a and 73b, 73b joined by surfaces 73c. Received between surfaces 73b and adapted to bear against surfaces 73c is a bar 74 having threaded bores at its ends adapted to screwthreadedly receive bolts 75 which pass through bearing block 71 and between surfaces 73a. The outer ends of bolts 75 are provided with handles 75a by means of which the bolts may be taken up to clamp the bearing block against surface 72a. It will be noted in Fig. 9 that bolts 75 have limited clearance between surfaces 73a and that bar 74 has similar clearance between surfaces 73b, the purpose of which is to permit the arbor to be self-adjusting transversely (as well as vertically) of the arbor support prior to clamping the bearing block to the arbor support. This arrangement serves two purposes—to compensate for any mal-alinement of the lathe bed, and to eliminate the necessity of precisely alining T slot 73 with the spindle.

Arbor support 72 is provided with surfaces 72b and 72c slidably engageable with ways 12 and 14, and with clamping bolt 72d and plate 72e for clamping the arbor support to the ways—all in the same manner as described in connection with the spindle-support base.

The lathe carriage, generally indicated at 78, is fragmentarily shown in Figs. 1, 2, 10 and 12 and is adapted to be moved longitudinally along the ways of the lathe bed by the usual traversing and feeding mechanism (not shown). The carriage is provided with dove-tail ways 78a along which the usual tool-post-supporting cross slide (not shown) is adapted to be moved by its screwthreaded connection with cross-feed screw 79, the latter being actuated either manually by hand crank 79a or by power in the usual manner.

The work table attachment 80, having dove-tail surfaces 80a slidingly engageable with ways 78a, is adapted to replace the cross slide and to have screwthreaded engagement with the cross-feed screw so that the work supported thereby may be moved or fed longitudinally or transversely with respect to the spindle or arbor. The screwthread engagement between the cross-feed screw and the work table is provided by nut 81 which is secured to the under surface of the work table by means of dowels 82 and bolt 83, the latter having a hex-socketed head 83a that is recessed into the top surface 85 of the work table.

A guard 84, bolted to the rear face of the work table at 84a, is provided for the purpose of preventing damage to surfaces 78a and 80a by metal chips or other foreign particles.

A marginal coolant trough 86 is provided in the top surface of the work table between marginal flange 87 and central table portion 88, and provided in the latter, and opening into said trough, are parallel T slots 89 and 89a. Slots 89 extend from the front face to the rear face of table portion 88, while slots 89a extend inwardly only part way from said faces. A V groove 90, centrally provided in table surface 85, connects the inner ends of slots 89a, and this V groove serves to position any bar or cylindrical stock, such as indicated in dot-dash lines at 91 in Fig. 12, accurately at right angle to the spindle or arbor axis. Groove 90 intersects the bore receiving the head of bolt 83, and, since the required depth of groove 90 is considerably less than that of slots 89–89a, sufficient table depth for the recessing of head 83a of said bolt is obtained without unnecessarily decreasing the table strength at the attachment point of nut 81 or adding to the thickness and weight of the table. The work may be clamped in groove 90 or against table surface 85 by such means indicated in dot-dash lines in Fig. 12 comprising clamping plates 92 and bolts 93, the bolts having heads 94 engageable with T slots 89 (or alternatively with slots 89a).

In Fig. 1, I show at 95 a pad having a machined outer surface 95a parallel with the adjacent side edge area 96 of the work table attachment 80. This pad, in conjunction with the said side edge of the work table attachment, is useful in enabling the user, by using for instance an inside micrometer, to accurately measure the displacement of the work carriage relative to the spindle head during operations which make such accurate measurements desirable.

While, in the foregoing description, I have resorted to various details of structure and association of parts, I wish it understood that I do not thereby confine my invention to such specific details. Rather, various modifications and adaptations may be made within the broader scope of the invention as defined by the appended claims.

I claim:

1. In a milling device, a body having an upright portion presenting a plane front surface and oppositely beveled side surfaces, a carriage having a vertical channel whose bottom face is plane and slidably engages the body front surface, one side wall of the channel being beveled to slidably engage one of said side surfaces of the upright portion and the other side wall of the channel being disposed at right angles to the bottom face and being spaced from the other side surface of the upright portion, and means for resiliently clamping the carriage in adjusted position along the upright portion, comprising a gib fitting between and conforming to the last-mentioned channel wall and the last-mentioned side surface of the upright portion, a shim positioned between the inner face of the gib and the bottom face of the channel and terminating short of the ends of the gib and screw means operatively engaging the respective ends of the gib at points spaced outwardly from the ends of the shim whereby to resiliently draw the gib against said other tapered side surface of the upright portion.

2. In a milling device, a body having an upright portion presenting a plane front surface and oppositely beveled side surfaces, a carriage having a vertical channel whose bottom face is plane and slidably engages the body front surface, one side wall of the channel being beveled to slidably engage one of said side surfaces of the upright portion and the other side wall of the channel being disposed at right angles to the bottom face and being spaced from the other side surface of the upright portion, an elongated gib fitting between and engaging the last-mentioned channel wall and the last-mentioned side surface of the upright portion, a pair of bolts extending through the gib and carriage, said bolts each carrying an angular nut bearing against the gib, and a bar detachably secured along the gib between and bearing at its respective ends against said respective nuts whereby to restrain rotation thereof.

3. In combination with a lathe having a bed presenting longitudinal ways extending from the headstock to the tailstock end of the bed, a carriage movably mounted on the bed, a tool operating spindle journalled in the carriage parallel to the ways, a headstock spindle journalled in the headstock, means operatively connecting the headstock spindle and tool operating spindle, a work table movably mounted on the ways between the carriage and tailstock, a cutter arbor secured at one end to the tool operating spindle and extending at its other end towards the tailstock and means adjustably mounted on the tailstock end of the bed for rotatably supporting the last-mentioned end of the cutter arbor, comprised of an upright member presenting a longitudinal T-slot opening towards the adjacent end of the cutter arbor, a slide block movable along the inner face of the upright member over the slot, cutter arbor bearing means carried by the block and bolt and nut means slidably mounted in the T-slot and extending through the slide block whereby to clamp said block against said inner face, the portions of the bolt and nut means within the slot being relatively narrower than the slot whereby to permit the cutter arbor automatically to adjust its longitudinal axis to conform to the longitudinal axis of the tool operating spindle when said bolts are loosened with respect to the slide block and slide bar.

4. In combination with a lathe having a bed presenting longitudinal ways extending from the headstock to the tailstock end of the bed, a carriage movably mounted on the bed, a tool operating spindle journalled in the carriage parallel to the ways, a headstock spindle journalled in the headstock, means operatively connecting the headstock spindle and tool operating spindle, a work table movably mounted on the ways between the carriage and tailstock, a cutter arbor secured at one end to the tool operating spindle and extending at its other end towards the tailstock and means adjustably mounted on the tailstock end of the bed for rotatably supporting the last-mentioned end of the cutter arbor, comprised of an upright member adjustably secured at its lower end to the ways and presenting a longitudinal T-slot opening towards the adjacent end of the cutter arbor, a slide block movable along the inner face of the upright member over said slot, cutter arbor bearing means carried by the block, a slide bar mounted for movement along the cross portion of the T-slot, longitudinally spaced threaded holes in the slide bar, bolts threadedly mounted at their inner ends in said respective holes and having their shanks projecting outwardly through the central portion of the T-slot and the slide block and operating handle means carried by the outer ends of said shanks, said shanks being of smaller diameter than the width of said central portion of the T-slot and said slide bar being narrower than the cross portion of the T-slot whereby to permit the cutter arbor automatically to adjust its longitudinal axis to conform to the longitudinal axis of the tool operating spindle when said bolts are loosened with respect to the slide block and slide bar.

PAUL HELLMAN.